United States Patent [19]

Gatewood

[11] Patent Number: 4,465,172

[45] Date of Patent: Aug. 14, 1984

[54] CLUTCH DISC WITH A VARIABLE TORSIONAL DAMPER

[75] Inventor: Sidney U. Gatewood, Roseville, Mich.

[73] Assignee: Borg-Warner Corporation, Chicago, Ill.

[21] Appl. No.: 296,943

[22] Filed: Aug. 28, 1981

[51] Int. Cl.³ .................... F16D 3/12; F16D 13/64
[52] U.S. Cl. ........................ 192/106.2; 192/70.17; 192/103 R; 192/106.1; 464/68; 464/100
[58] Field of Search ............. 192/106.1, 106.2, 70.17, 192/70.18, 55, 103 R; 464/64, 66, 68, 100, 101, 1

[56] References Cited

U.S. PATENT DOCUMENTS

| | | | |
|---|---|---|---|
| 1,047,841 | 12/1912 | Ruthardt | 464/1 |
| 1,704,503 | 3/1929 | Gamble | 192/55 |
| 1,708,923 | 4/1929 | Cole | 464/101 |
| 1,896,025 | 1/1933 | Griswold | 464/101 X |
| 1,946,144 | 2/1934 | Hughes | 192/70.18 |
| 1,962,993 | 6/1934 | Leece | 464/100 |
| 1,967,052 | 7/1934 | Dumm | 192/106.1 |
| 2,017,591 | 10/1935 | Dumm | 192/106.1 |
| 2,143,040 | 1/1939 | Thelander | 192/70.18 |
| 2,724,252 | 11/1955 | Schmal | 192/106.1 |
| 2,751,766 | 6/1956 | Adachi | 192/106.1 |
| 2,826,902 | 3/1958 | Coursey | 192/106.2 X |
| 4,239,097 | 12/1980 | Greacen et al. | 192/106.2 |

FOREIGN PATENT DOCUMENTS

| | | | |
|---|---|---|---|
| 1935251 | 1/1970 | Fed. Rep. of Germany | 192/106.1 |
| 307421 | 8/1955 | Switzerland | 464/1 |
| 968623 | 9/1964 | United Kingdom | 192/106.1 |

Primary Examiner—Rodney H. Bonck
Attorney, Agent, or Firm—James A. Geppert

[57] ABSTRACT

A clutch driven plate assembly providing a variable torsional spring rate and variable friction damping torque. The assembly utilizes a splined hub with an outer flange notched at spaced locations around the circumference to receive a series of flat springs actuated by caged needle rollers mounted between a pair of side plates sandwiching the flange therebetween; one of the plates carrying the friction facings. The flat springs and rollers can be used alone or in combination with helical compression springs, and variable damping friction is accomplished either through the rollers alone or in conjunction with centrifugally actuated balls positioned in an annular tapered groove between the hub flange and one of the side plates.

13 Claims, 14 Drawing Figures

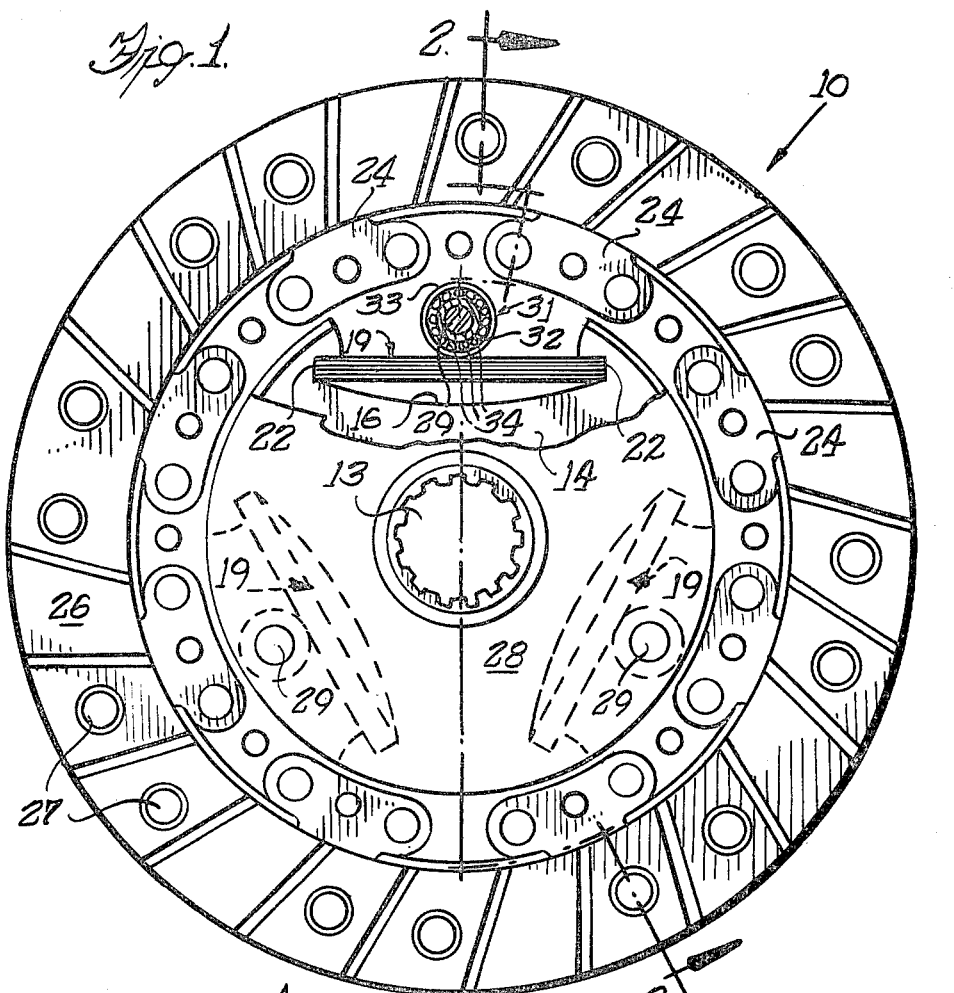

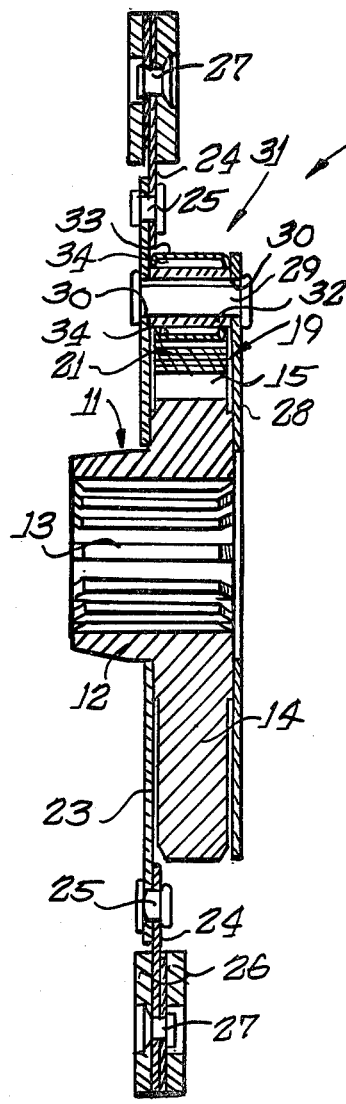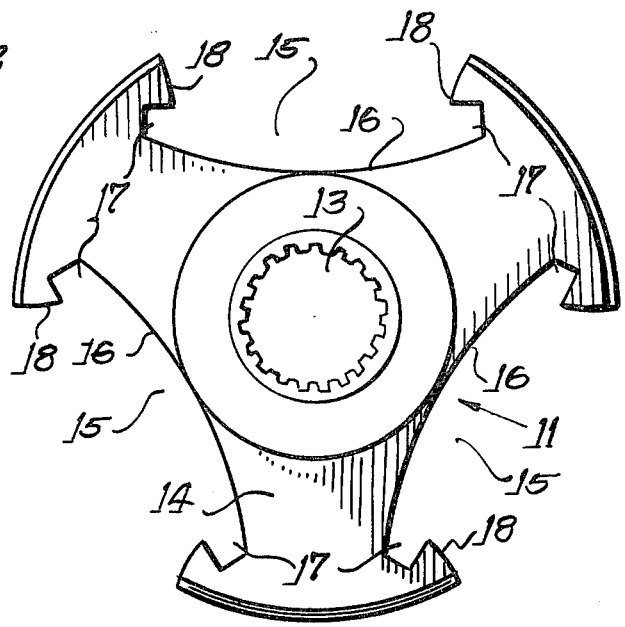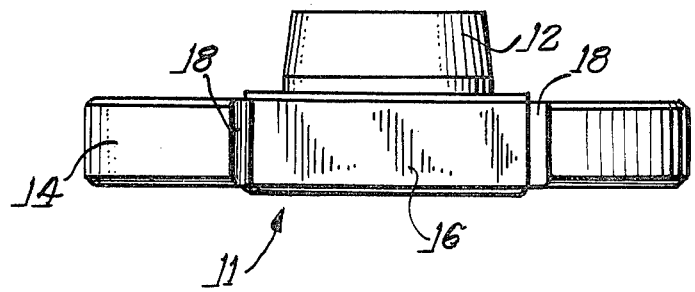

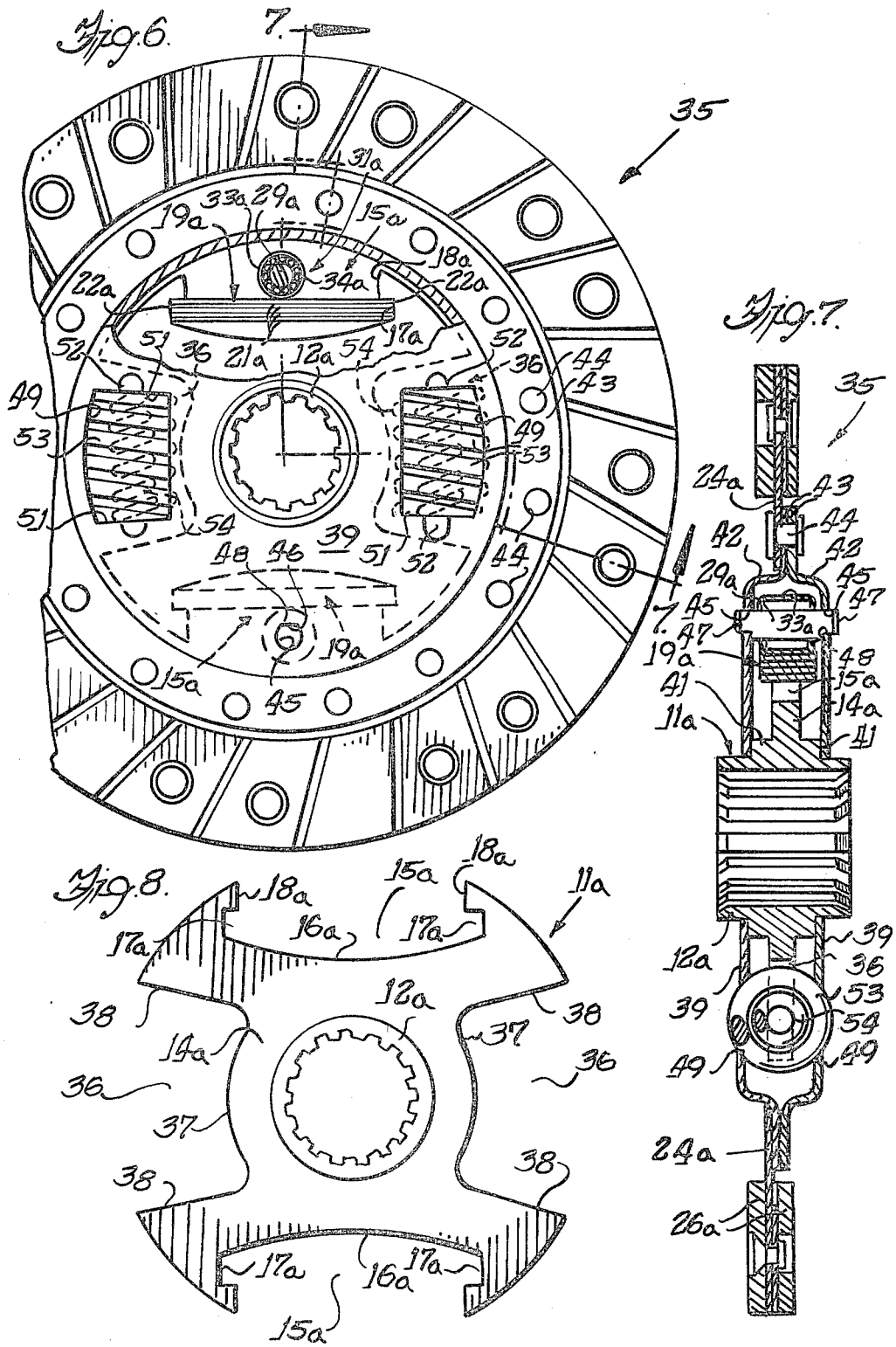

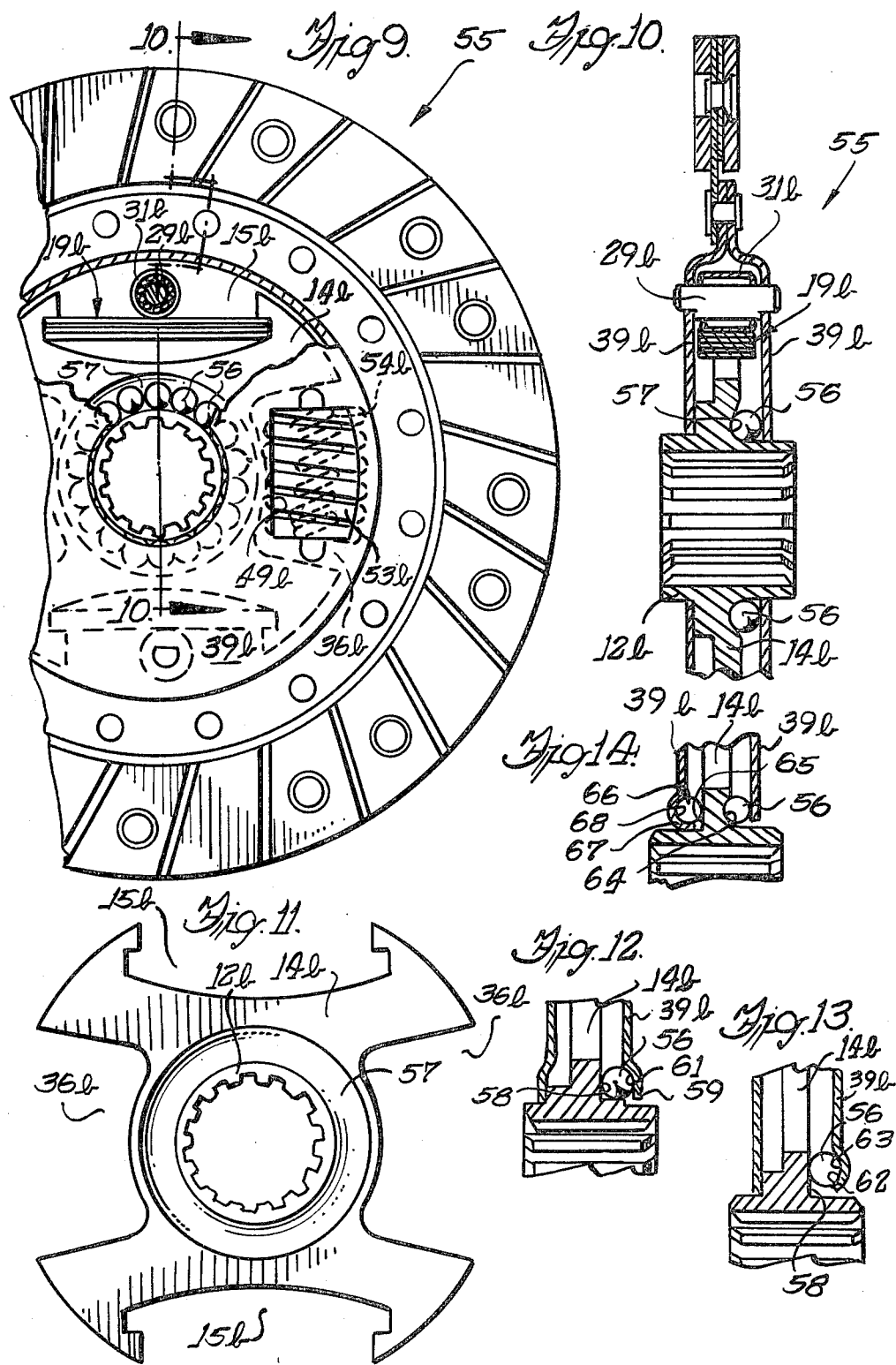

CLUTCH DISC WITH A VARIABLE TORSIONAL DAMPER

BACKGROUND OF THE INVENTION

A vibration damper assembly is generally utilized in a clutch driven plate assembly for a motor vehicle power train to control engine induced torsional vibration in the connected elements of the power train which will produce objectionable conditions, i.e. impact loads, pulsations, noises, etc. Circumstances sometimes occur which require a vibration damper having special characteristics to control objectionable vibration and/or gear rattle in the transmission or drive line which may occur at neutral idle or under engine full load. A damper with a straight line torque vs. amplitude curve will not always satisfy all conditions of use, therefore a damper may be required with a step-rate torsional spring characteristic having a very low initial rate, which progressively increases to provide a final torque requirement with a smooth transition from one step to the next.

In most current damper assemblies, torsional spring rates are generally high based on the required torque capacity and available amplitude. The increasing use of smaller engines and the desire to reduce engine idle rpm results in excessive transmission rattle at a low idle speed. Damper assemblies with an extremely low initial torsional spring rate and zero or minimal damping friction have been successful in reducing idle gear rattle, however, damping friction normally required to reduce vehicle driveline torsional vibrations is difficult to control in a damper which combines low and high torsional spring rates. The present invention provides novel damper arrangements to overcome the above-mentioned problems.

SUMMARY OF THE INVENTION

The present invention comprehends the provision of a novel clutch vibration damper assembly utilizing flat springs to provide the desired torque capacity instead of the usual helical compression springs. The flat springs are used in the manner of a simple beam, with the load increase achieved by progressively moving the load point from the neutral center of the spring toward either end. When the damper is in the static or neutral position, the flat springs are lightly preloaded but remain in a substantially flat position. A needle roller cage is mounted on a pin extending between the side plates of the assembly to contact each flat spring and, when the hub is held stationary and the side plates are rotated, the roller cage is free to rotate and move from the neutral position of the spring toward a spring end as a result of the travel arc. This movement results in a progressive increase in load to provide the required torque capacity.

The present invention also comprehends the provision of a novel vibration damper assembly having a variable friction damping torque due to the inherent friction of the needle roller cage when in contact with the flat spring. As the roller cage travels upon rotation of the side plates relative to the hub, a low friction damping torque occurs with the low torsional spring rate and increases to a high damping friction torque as the torsional spring rate increases.

The present invention further comprehends the provision of a novel torsional vibration damping assembly utilizing a pair of flat springs in combination with pairs of helical compression springs. The flat springs are used to provide the initial low torsional spring rate for initial damper travel, at which time the compression springs are activated and the combined load of the flat and helical springs provide increasing torque in a non-linear path as the damper is deflected.

A further object of the present invention is the provision of a multiple stage torsional vibration damper assembly having variable damping friction achieved by the utilization of a plurality of steel balls nested in an annular tapered groove formed between the hub flange and a side plate. Outward movement of the balls due to centrifugal force results in an axial force of the balls against the hub flange and plate to provide frictional drag on the side plates.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view with a portion broken away of a clutch plate assembly embodying the present invention.

FIG. 2 is a cross sectional view of the clutch assembly taken on the irregular line 2—2 of FIG. 1.

FIG. 3 is a partial rear elevational view of the clutch plate assembly of FIG. 1 with a portion broken away to show the position of the damping spring under applied torque.

FIG. 4 is a rear elevational view of the hub for the clutch assembly.

FIG. 5 is a top plan view of the hub of FIG. 4.

FIG. 6 is a rear elevational view with portions broken away of a second embodiment of clutch plate assembly with an alternate vibration damper.

FIG. 7 is a cross sectional view taken on the irregular line 7—7 of FIG. 6.

FIG. 8 is a rear elevational view of the hub for the clutch plate assembly of FIG. 6.

FIG. 9 is a partial rear elevational view with portions broken away of a third embodiment of clutch plate assembly.

FIG. 10 is a partial cross sectional view taken on the irregular line 10—10 of FIG. 9.

FIG. 11 is a rear elevational view of the hub for the clutch plate assembly of FIG. 9.

FIGS. 12 through 14 are partial cross sectional views showing alternate arrangements for the centrifugally actuated friction balls.

DESCRIPTION OF THE PREFERRED EMBODIMENTS

Referring more particularly to the disclosure in the drawings wherein are shown illustrative embodiments of the present invention, FIGS. 1 and 2 disclose a clutch plate assembly 10 having a torsional vibration damper therein, the assembly including a hub 11 (FIGS. 4 and 5) having a barrel 12 with an internally splined central opening 13 adapted to receive the externally splined end of a transmission input shaft (not shown). An integral hub flange 14 is axially offset at one end of the barrel and is provided with three circumferentially equally spaced notches 15, each formed with a concave surface 16 extending between a pair of axially extending slots or channels 17,17 with an overhang forming a shoulder 18 at the periphery of the flange.

A flat spring 19, consisting of a stack of leaf springs 21, has the opposite ends 22,22 received in the slots 17,17, with the spring extending across the notch as seen in FIG. 1. A clutch driven side plate 23 is journalled on the hub barrel 12 and carries the annular friction facings 26,26 through a series of cushion springs 24 secured to the plate 23 adjacent its periphery by rivets 25; the facings 26 being suitably secured to the springs 24 as by rivets 27. A side plate 28 is located on the opposite side of the hub flange 14 from the plate 23 and is secured thereto by pins 29.

The pins extend through openings 30 in the plates and are headed, and an inner bearing race 32 encompasses each pin between the plates. An outer needle bearing sleeve 33 encompasses a plurality of needle bearings 34 positioned on the inner bearing race 32 to form a needle bearing cage 31.

In the neutral position, each needle bearing cage 31 contacts the flat spring 19 at its center to exert a light preload (see FIG. 1). With the clutch engaged and torque applied to the friction facings 26, the plates 23 and 28 are rotated in the direction of the arrow A (FIG. 3) to cause each needle bearing cage 31 to travel in an arc and progressively deflect its respective spring 19. This action of the spring deflecting provides a non-linear, no step, parabolic-type curve for torque vs. amplitude. Also, the inherent friction of the needle bearing cages results in an initial low damping friction torque at the low torsional spring rate and a high damping friction torque as the cage rotates and moves toward the spring end. The shoulders 18 at the overhang of the hub slots acts as stops for the needle bearing cages 31 to prevent overtravel of the damper which could affect spring stress.

FIGS. 6, 7 and 8 disclose an alternate damper design for a clutch plate assembly 35 wherein like parts will receive the same reference numeral with the addition of a script a. The assembly includes a hub 11a having a barrel 12a with a centrally located radial flange 14a containing a pair of diametrically opposed elongated notches 15a and a pair of diametrically opposed spring notches 36 removed 90° from the notches 15a. Each notch 15a has a concave surface 16a terminating at each end in a slot 17a having an overhang forming a shoulder 18a at the flange periphery. Flat springs 19a are received in the notches 15a (FIG. 6) with the opposite ends 22a,22a located in the slots 17a,17a; each flat spring being formed of a plurality of leaf springs 21a.

Each spring notch 36 has a convex base portion 37 and a pair of substantially straight slightly diverging sides 38,38 extending from the base portion to the flange periphery. A pair of drive plates 39,39 are journalled on the hub barrel 12a on the opposite sides of flange 14a at shoulders 41,41 formed on the barrel. Each plate is provided with an offset portion 42 beyond the periphery of the flange 14a extending towards each other and terminating in a radial flange 43 abutting the flange of the opposite plate and joined together by rivets 44, which also secure thereto the cushion springs 24a carrying the friction facings 26a,26a.

Each plate has a pair of diametrically opposed openings 45 receiving the ends 47 of pins 29a carrying needle roller cages 31a; each opening having a flattened surface 46 to form a D-type hole. Each pin end 47 also has a flattened surface 48 complementarily received in the opening 45 to prevent pin rotation. The needle roller cages 31a each include a plurality of needle rollers 34a receiving the pin 29a and an outer bushing or sleeve 33a encompassing the rollers and contacting the central portion of the flat spring 19a to exert a slight preload thereon.

Also, each plate has a pair of diametrically opposed spring windows 49; each window having end surfaces 51 with an inwardly depressed dimple or tang 52 therein. A pair of concentric helical springs 53 and 54 are received in each axially aligned pair of spring windows 49 and spring notch 36; each notch being substantially longer than the associated spring windows 49. The outer helical springs 53 are in contact with the ends 51 of windows 49, while the inner helical springs 54 are substantially shorter than the outer springs to provide a step rate effect.

With the parts in the neutral position shown in FIG. 6, as the drive plates 39,39 are rotated, each needle roller cage 31a is free to rotate and move away from the neutral center position of the flat spring 19a to provide a first stage torsional spring rate. The outer helical springs 53 move with the drive plates but are ineffective until contact is made with the sides 38 of the spring notches to activate the second stage travel. When the outer springs 53 are compressed to the length of the shorter inner springs 54, the third stage springs are activated for the remainder of damper rotation. In operation under maximum torque, the outer helical springs 53 are designed to close to solid height, therefore, stop pins as normally used are omitted.

In a damper utilizing an extremely low first stage torsional spring rate, excessive "clunk" is the undesired result of providing excessive angular movement. "Clunk" occurs as the damper rotates through the low torsional spring rate first stage and into a much higher succeeding stage. To overcome the undesirable "clunk", a "soft" second stage torsional spring rate is utilized to smooth out the transition from an extremely low rate first stage to a much higher succeeding stage in the arrangement shown in FIGS. 6 to 8. This is accomplished by using an inner helical spring 54 that is longer than the outer helical spring 53. Operation is similar to that described above for assembly 35 except that the longer inner springs are activated to provide the softer second stage torsional spring rate after the first stage provided by the flat springs 19a until the outer helical springs are activated to provide the higher rate third stage. The tangs or dimples 52 at the ends 51 of the drive plate windows 49 are provided as driving surfaces for the longer inner springs 54.

FIGS. 9 through 11 disclose a third embodiment of clutch plate assembly 55 wherein like parts have the same reference numeral with a script b. This embodiment provides variable damping friction through the utilization of a series of hardened steel balls 56 nested in an annular tapered groove 57 formed in the hub flange 14b. The rear side plate 39b cooperates with the groove in the hub flange so that outward movement of the balls due to centrifugal force results in an axial force of the balls against the hub flange 14b and side plate 39b to provide frictional drag on the side plates.

The remainder of the assembly 55 is identical with that shown in FIGS. 6–8, including a hub flange 14b having notches 15b receiving flat springs 19b and spring notches 36b receiving inner helical springs 54b and outer helical springs 53b, a pair of side plates 39b,39b journalled on the hub barrel 12b and having pins 29b extending therebetween for needle bearing cages 31b, and spring windows 49b.

With the assembly in a static condition, the overall stackup of the hub flange 14b and ring of balls 56 is slightly less than the distance between the inner faces of the side plates 39b,39b to allow free rotation of the side plates relative to the hub. When the assembly is rotated about its axis, the balls 56 will move slightly outwardly in the groove 57 between the hub flange 14b and rear side plate 39b due to centrifugal force, but movement of the balls is restricted due to the taper angle and contact with the side plate.

Since the taper converges toward the rear side plate 39b, any outward movement of the balls 56 simultaneously results in axial movement of the balls with a resultant axial thrust load on the mating parts which creates the desired damping characteristics. In a damper which has an extremely low initial torsional spring rate and subsequently increasing torsional spring rates, zero or low initial damping friction must be provided, and increasing damping friction must be provided to satisfy the increased torsional spring rates. The utilization of the balls activated by centrifugal force provides these characteristics since the damping friction increases by the square of the rpm.

FIGS. 12, 13 and 14 disclose alternate arrangements of the clutch assembly 55 utilizing the hardened steel balls 56 to provide the friction damping. In FIG. 12, the shoulder 58 of the hub flange 14b is a square corner and the inner periphery 59 of rear side plate 39b is outwardly offset to provide a tapered wall surface 61. FIG. 13 is similar to FIG. 12, except the inner periphery 62 of rear side plate 39b provides a rounded annular surface 63 receiving the balls 56.

FIG. 14 discloses a combination arrangement utilizing a hub having a flange 14b with a rounded groove 64 on the rear surface and a square shoulder 65 on the front surface. A ring of steel balls 56 is provided in the groove 64 and a second series of steel balls 66 on the shoulder 65; the front side plate 39b having an inner periphery 67 with a rounded annular surface 68 to receive the balls 66 and the rear side plate 39b being flat. All of these three arrangements operate in the same manner as described for the structure of FIGS. 9 through 11.

I claim:

1. A variable torsional vibration damper assembly for utilization in a vehicle clutch, comprising a hub operatively connected to torque output means and having a radial flange including a pair of diametrically opposed peripheral notches and a pair of diametrically opposed spring notches removed 90° from said peripheral notches, each peripheral notch having an overhanging shoulder at each end forming a slot, an elongated flat spring positioned in each notch with the opposite ends supported in said opposed slots, a concave edge extending between said opposed slots to allow inward deflection of said flat spring, a pair of side plates journalled on said hub and having two spacer pins extending therebetween, a rotary member supported on each pin and contacting the center of a flat spring and causing deflection thereof upon movement of said rotary member relative thereto, each side plate having a pair of spring windows axially aligned with said spring notches, a pair of concentric helical springs in each aligned set of windows and spring notch, and clutch facings carried on one of said side plates.

2. A variable torsional vibration damper assembly as set forth in claim 1, wherein said side plates include axially offset portions beyond the hub flange terminating in abutting radial flanges secured together, said clutch facings operatively connected to the radial flanges, said side plates having axially aligned irregular openings receiving complementarily shaped spacer pin ends to prohibit rotation of the pins.

3. A variable torsional vibration damper assembly as set forth in claim 2, wherein indented tangs are formed in the end edges of said side plate spring windows to engage the inner helical spring.

4. A variable torsional vibration damper assembly as set forth in claim 3, in which said inner springs are shorter than said outer springs.

5. A variable torsional vibration damper assembly as set forth in claim 3, in which said inner springs are longer than said outer springs.

6. A variable torsional vibration damper assembly for utilization in a vehicle clutch, comprising a hub operatively connected to torque output means and having a radial flange with a pair of diametrically opposed peripheral notches and a pair of diametrically opposed spring notches removed 90° from said peripheral notches, an elongated flat spring positioned in each peripheral notch with the opposite ends supported therein, a pair of side plates journalled on said hub and having a pair of spacer pins extending therebetween, a rotary member supported on each pin and contacting the center of a flat spring, clutch facings carried on one of said side plates, each side plate having a pair of spring windows axially aligned with said spring notches, a pair of concentric helical springs in each aligned set of windows and spring notch, a tapered groove formed between said hub flange and at least one side plate adjacent the hub barrel, and a plurality of steel balls received in said tapered groove.

7. A variable torsional vibration damper assembly as set forth in claim 6, in which centrifugal force resulting from rotation of the assembly causes outward movement of said balls in the groove to provide variable friction damping.

8. A variable torsional vibration damper assembly as set forth in claim 6, in which said tapered groove is formed in the hub flange.

9. A variable torsional vibration damper assembly as set forth in claim 8, in which said side plate facing the tapered groove is flat, and the opposite side plate has a rounded annular surface at its inner periphery, and a second series of steel balls received in the rounded surface of said last-mentioned side plate.

10. A variable torsional vibration damper assembly as set forth in claim 6, in which the periphery of a side plate provides the tapered groove surface.

11. A variable torsional vibration damper assembly as set forth in claim 10, in which said side plate has an offset inner periphery joined by a tapered portion.

12. A variable torsional vibration damper assembly as set forth in claim 10, in which said side plate has a rounded annular surface at the inner periphery thereof.

13. A variable torsional vibration damper assembly for utilization in a vehicle clutch, comprising a hub operatively connected to torque output means and having a radial flange with at least two peripheral notches therein, each notch having an overhanging shoulder at each end forming a slot, an elongated flat spring positioned in each notch with the opposite ends supported in said opposed slots, a concave edge extending between said opposed slots to allow inward deflection of said flat spring, a pair of side plates journalled on said hub and having at least two spacer pins extending therebetween, a rotary member supported on each pin and contacting the center of a flat spring and causing deflection thereof upon movement of said rotary member relative thereto, clutch facings carried on one of said side plates, a tapered groove formed between said hub flange and at least one side plate adjacent the hub barrel, and a plurality of steel balls received in said tapered groove.

* * * * *